United States Patent [19]

Dunford

[11] Patent Number: 5,553,868
[45] Date of Patent: Sep. 10, 1996

[54] SEAL CAVITY THROAT BUSHING

[76] Inventor: Joseph R. Dunford, 1310 Rocky La. Dr., Waverly, Nova Scotia, Canada

[21] Appl. No.: 334,363

[22] Filed: Nov. 3, 1994

[51] Int. Cl.⁶ ........................................ F16J 15/34
[52] U.S. Cl. .................. 277/24; 277/65; 277/134; 415/175
[58] Field of Search .................. 277/24, 53, 65, 277/67, 134, 203; 415/111, 112, 175, 180

[56] References Cited

U.S. PATENT DOCUMENTS

| | | | |
|---|---|---|---|
| 1,511,481 | 10/1924 | Koekler | 277/134 |
| 3,246,901 | 4/1966 | Wickli | 277/134 |
| 3,258,199 | 6/1966 | Anderson | 415/175 |
| 3,468,548 | 9/1969 | Webb | 277/134 |
| 3,558,238 | 1/1971 | Van Herpt | 277/134 |
| 4,645,213 | 2/1987 | Washimi et al. | 277/203 |
| 4,786,238 | 11/1988 | Glaser et al. | 415/175 |
| 4,872,690 | 10/1989 | Dunford . | |
| 5,035,436 | 7/1991 | Rockwood et al. . | |
| 5,167,418 | 12/1992 | Dunford . | |
| 5,195,867 | 3/1993 | Stirling . | |

FOREIGN PATENT DOCUMENTS

| | | | |
|---|---|---|---|
| 622874 | 6/1971 | Canada | 277/134 |
| 1800888 | 5/1969 | Germany . | |

*Primary Examiner*—Scott W. Cummings
*Attorney, Agent, or Firm*—Jones, Tullar & Cooper, P.C.

[57] ABSTRACT

A new throat bushing for use with rotary fluid equipment (10) having a seal cavity (28) defined by a shaft (14), a shaft housing (13), and a seal (26) engaging the shaft, which includes an annular shaped element (50, 62, 66, 90, 92, 108, 120) for securement to the housing (13) at the entrance to the cavity. The shaft can pass through the element and rotate freely, without contact. A spiral groove (64, 88, 98, 122), or multiple spiral grooves, may be cut into the radial surface (60) facing towards the seal. The groove is configured to guide any abrasives radially inwardly, away from the cavity bore, toward the shaft. Through this mechanism, any contaminants are easily removed from the seal cavity by the use of a minimum flow of clean flush injected into the seal cavity.

23 Claims, 9 Drawing Sheets

SEAL CAVITY THROAT BUSHING

This invention relates to a device which can be positioned at the entrance to a seal cavity in rotary fluid equipment to protect the cavity and any mechanical seal therein from contaminant particulate material and/or to increase the fluid pressure within the cavity.

BACKGROUND OF THE INVENTION

Rotary fluid equipment such as a centrifugal pump, usually includes a rotary operative member such as an impeller which is driven by a prime mover such as an electrical motor. A rotary shaft connects the prime mover to the operative member. Typically the operative member is contained within its own housing, having an inlet and an outlet for the fluid being moved, with the shaft passing through the back of the housing. The shaft may be supported by bearings and usually there will be seals engaging the shaft to prevent fluid which enters the housing from reaching the prime mover. The seals, shaft and seal housing define a seal cavity which opens towards the housing containing the operative member.

During operation, the fluid rotates within the seal housing, imparting a centrifugal force on any contaminant abrasives therein. The abrasives are thus thrown radially outwardly towards the wall of the cavity in the seal housing. Abrasive removal is normally accomplished by injecting a high flow of clean fluid into the cavity to force the abrasives away from the cavity wall and under the throat bushing for ejection. Normally, a dirty fluid cannot be used for fear of abrasives accumulating in the seal cavity. Typically, on a 2 inch shaft, about 4–6 gallons of clean fluid per minute is required to remove the abrasives, while only about ½ gallon per minute is needed to cool the mechanical seal faces. Using the current invention, the abrasives are presented at the best location for removal, allowing ejection by the low flow rate required for cooling. Considering the cost of sourcing clean fluid, the reduction of 1.5 to 2.5 million gallons per year per continuous running pump can result in appreciable savings. In addition, a dirty fluid can be used in high volumes, to achieve pressurization of the cavity to prevent seal damage due to flashing of high temperature fluids, without the risk of accumulation of abrasives in the seal cavity.

The current invention accomplishes this by providing a throat bushing or protector which has a face surface that slopes towards the throat from the area of the cavity wall to the area of the shaft. Preferably the sloping face will include at least one spiral groove into which contaminant material will be forced by the fluid flow in the seal cavity. Centrifugal force will hold the abrasive contaminant material in the groove, and the rotating fluid will drive it forward. As the abrasives are driven forward, the spiral winds inward, carrying them toward the shaft. At the shaft the abrasives will pass outwardly between the shaft and the bushing or protector of they can be guided into an optional groove on the inside axial surface of the throat bushing or protector which, with the help of a small fluid flow, guides the abrasives to the exterior of the seal cavity.

In seal cavities where the distance from the bore wall to the shaft is very small, the seal side of the throat bushing is sloped at a small angle to gently guide the abrasives radially inwardly. In seal cavities having larger cross sections, the gentle slope from the bore wall leads the abrasives to the spiral groove or grooves in the sloping wall of the throat bushing.

DESCRIPTION OF THE PREFERRED EMBODIMENT

Figure 1:
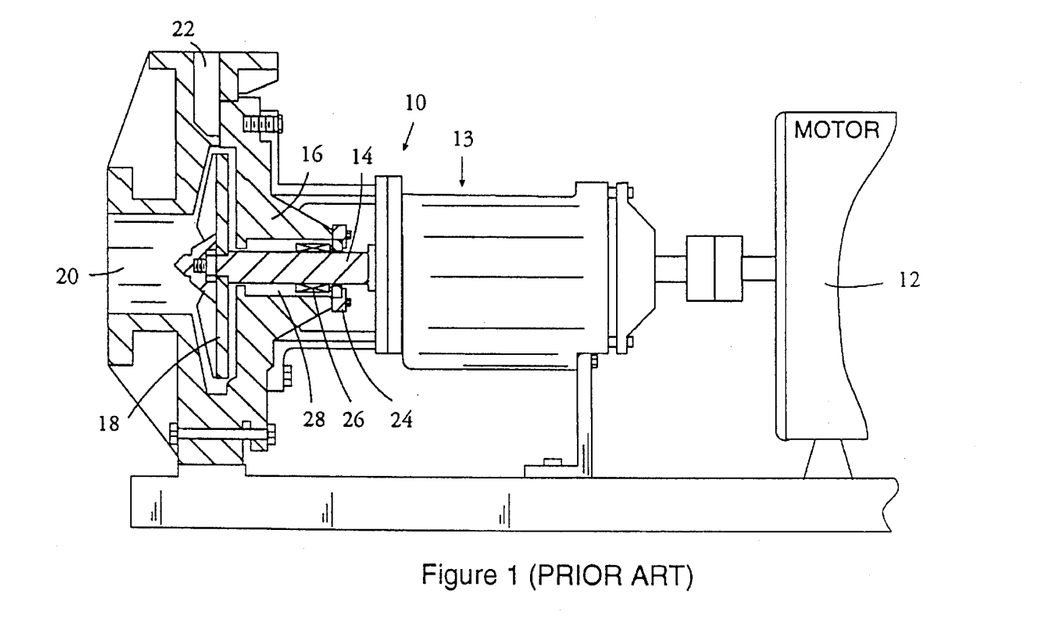
FIG. 1 shows, in partial cross section, an elevation view of typical fluid equipment in which this invention can be used.

FIG. 1 illustrates a typical environment for the device of the present invention. In this case the invention is used with rotary fluid equipment which includes a centrifugal pump 10 operated by an electric motor 12. The motor drives a rotary shaft 14 connected within a bearing housing 13. The shaft is connected to a centrifugal impeller 18 which, as it rotates, draws fluid in through inlet 20 and pumps the fluid out through radial outlet 22. The shaft 14 is typically supported by bearings within the bearing housing 13. As seen in FIG. 1 a seal cavity 28 is defined in general by the shaft 14, the housing 16 which surrounds at least a portion of the shaft, the seals 26 which contact the shaft at one end of the cavity, and the gland 24 used to retain the seals in position. Set screws (not shown) may also be used to hold the seals in position.

Figure 2:
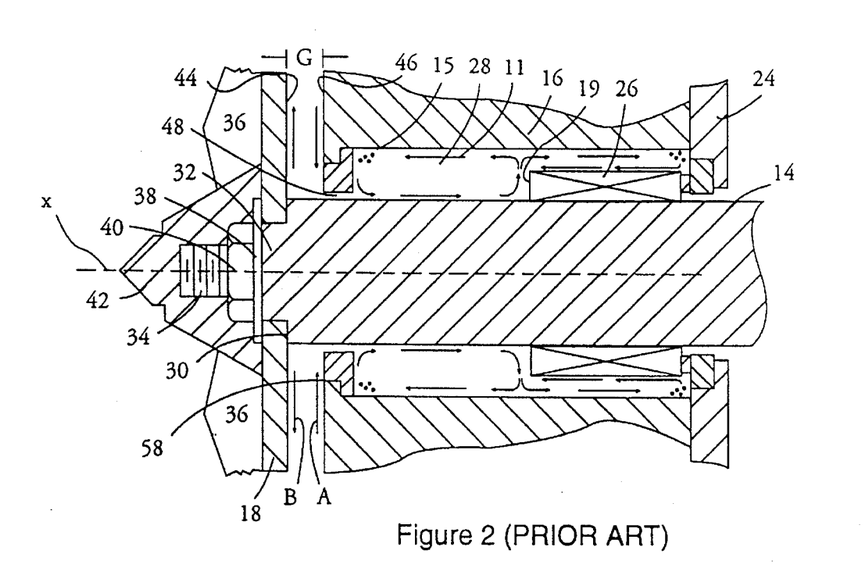
FIG. 2 is an enlarged cross sectional view at the entrance to the seal cavity, schematically showing a standard removable throat bushing.

FIG. 2 illustrates a somewhat enlarged view of the area where the shaft 14, having an axis X, connects to the impeller 18. It is seen therein that the shaft 14 has a shoulder 30 with a smaller diameter portion 32 extending therefrom. A threaded portion 34 projects from the portion 32. The impeller 18, with vanes 36, fits over the portion 32 and abuts the shoulder 30. A washer 38 and nut 40 are drawn tight against impeller 18 to clamp it to the shaft 14 and a nose piece 42 fits over the nut, washer and exposed end of the threaded portion 34. With the impeller in place there is a thin gap G between the inner face 44 of the impeller 18 and the outer face 46 of the housing 16.

The flow pattern of the fluid in a typical centrifugal pump sets up counter currents which flow spirally inwardly within the gap G, as shown generally by the arrows A. Such counter currents carry particulate contaminant material which, if it enters the seal cavity 28, can damage the seals 26 and the rotary shaft 14.

It should perhaps be pointed out that the spirally inward flow A will generally be adjacent to the surface 46. Since there are dynamic forces at work there will, of course, be a spirally outward flow B as well, such as along surface 44, taking fluid away from the shaft area.

With reference to FIG. 2, there will be fluid flow into the cavity 28 through the gap or opening 48 in the front face of the housing 16 adjacent the shaft 14. Such flow will include grit or particulate contaminant material which was moving spirally inwardly along the housing face 46. Within the cavity there will be flow of contaminant-carrying fluid generally along the path 11 shown by the arrows, bearing in mind that there is also a rotational component to the flow caused by shear between the fluid and the rotating shaft and seal, and between the rotating shaft and the housing cavity wall. The front face 19 of the seal 26 during rotation imparts the radially outward movement to the fluid, a portion thereof flowing towards the front of the cavity and a portion flowing towards the back, between the seal and the housing. There will be a concentration of contaminants in the forward area 15 of the cavity 28, adjacent the radially outer junction between the housing cavity wall and the lip or throat flange of the housing at the forward end, making for an ideal location in which to position the device of the present invention.

The throat bushing 50 of the present invention can take one of several configurations depending on the size of the seal cavity, the size and specific gravity of the particulate material, the configuration of the pump or equipment, the amount of particulate material in the pumpage, the need for seal cavity pressurization, and the desire to reduce or eliminate flush systems. The preferred embodiment will perform multiple functions and it is that embodiment which is shown in FIGS. 3 to 16.

Figure 3:
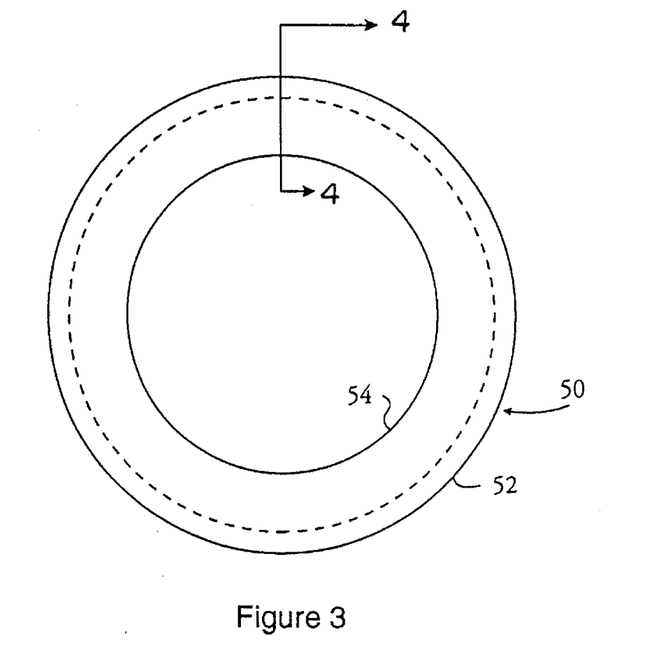
FIG. 3 is a front view of the preferred form of this invention.
Figure 4:
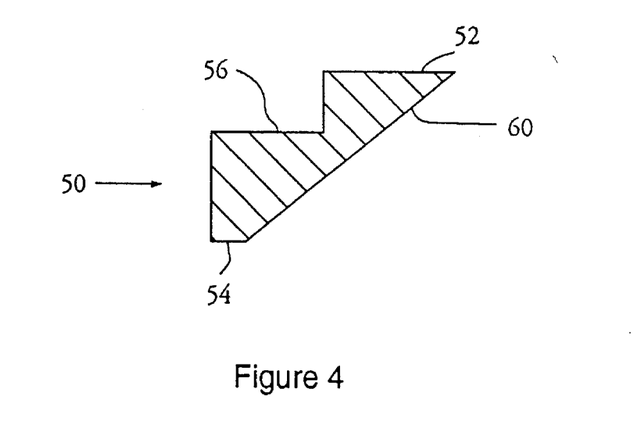
FIG. 4 is a cross section on the line A—A of FIG. 3, showing the angled or sloping front surface.

The seal cavity throat bushing 50 of this invention is depicted in FIGS. 3 and 4 in a basic form. FIG. 3 shows a front view in which it is seen that the bushing is annular in configuration, with a radially outer cylindrical surface 52 and a radially inner cylindrical or axial surface 54. There can be a step 56 to accommodate the lip or throat flange 58 (FIG. 2) at the front of the housing 16. The bushing 50 also has an angled surface 60 which faces the seal 26 in the cavity 28. The angle of the surface 60 should be in the range of from about 20 to about 40 degrees with respect to the surface 54, the cavity wall or the shaft axis X, the slope extending from the area of the cavity wall towards the gap 48 between the lip 58 and the shaft 14, depending on the specific gravity of the contaminants. As the shaft rotates and the contaminants follow generally the flow pattern shown in FIG. 2 they will encounter the sloping wall 60 generally in the area 15 and will be forced towards the gap 48 to exit the cavity.

Figure 5:
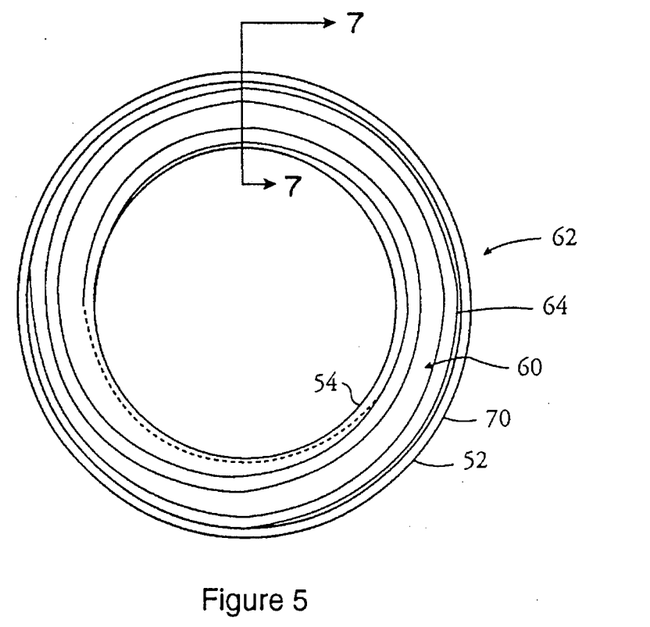
FIGS. 5 and 6 are front and rear views respectively of the preferred form of this invention, showing the slope leading into the spiral groove.
Figure 6:
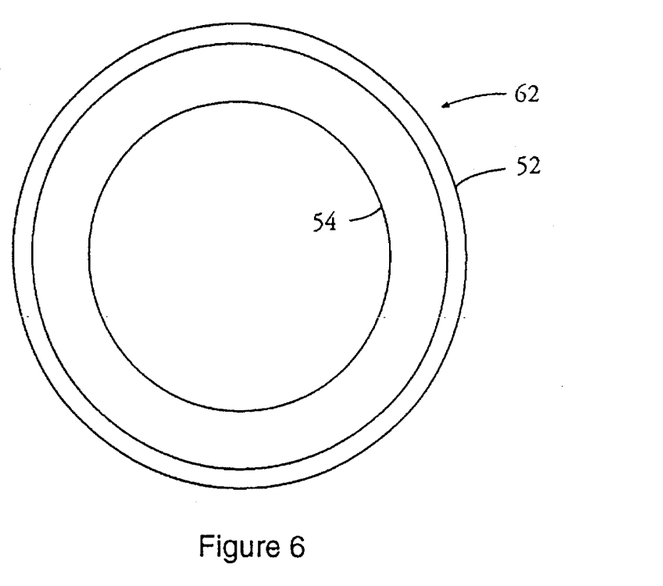

FIG. 5 shows a front view of a preferred form 62 of the present invention. In this embodiment there is a spiral groove 64 cut into the body of the bushing and opening to the sloping front face 60. The groove 64 has an axial or non-radial surface portion 66 extending inwardly from the face surface 60 and a radial surface portion 68 extending radially from the inner end of the axial surface back to the face surface. This groove captures fluid flowing in the cavity 28 and contaminants carried thereby and specifically directs such fluid and contaminants towards the gap 48 for removal from the cavity 28. Since pumps and other rotating fluid equipment may rotate in either direction, the hand of the spiral groove 64 must suit the rotation of the equipment such that the fluid and the contaminants carried thereby always spiral inwardly toward the shaft. The actual spiral groove commences after a gently sloped lead-in section 70 which makes it easier for the contaminants to enter the spiral groove section. The lead-in angle is normally shallow with a typical slope of 20 to 35 degrees. Thereafter, the inclination and pitch of the spiral groove will depend upon the anticipated size and specific gravity of the particular contaminant material. Large particulates require a longer axial thread surface to be transported without being swept off by eddies or vortexes.

Figure 7:
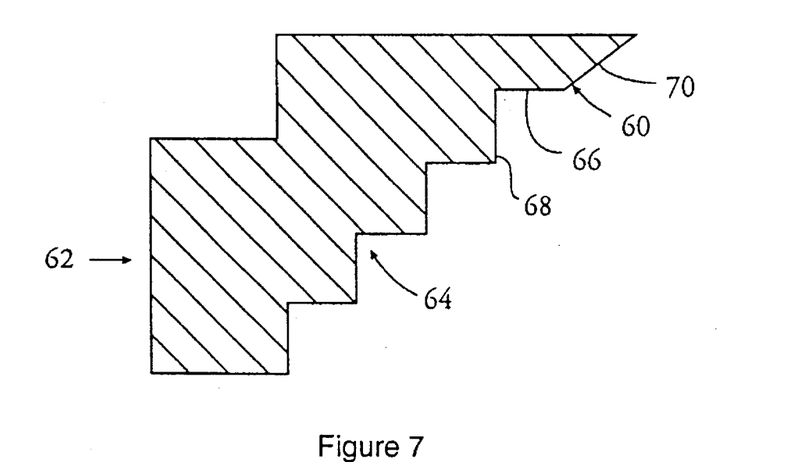
FIG. 7 is a cross section taken on the line B—B of FIG. 5.
Figure 8:
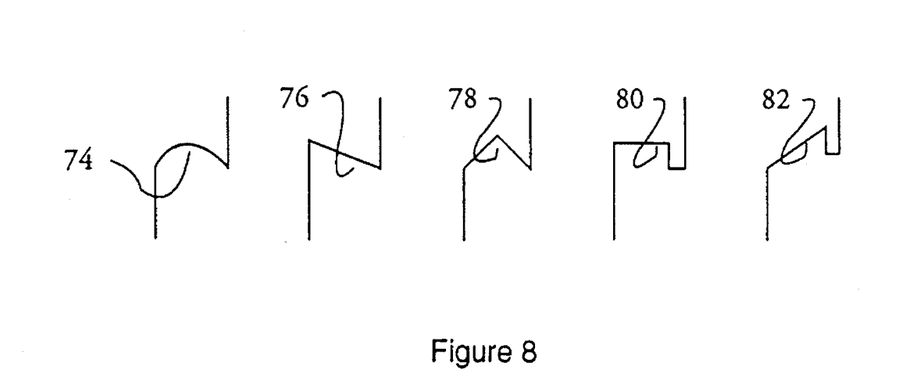
FIG. 8 is a cross sectional view showing various contours which could be used for the axial surface of the spiral.
Figure 9:
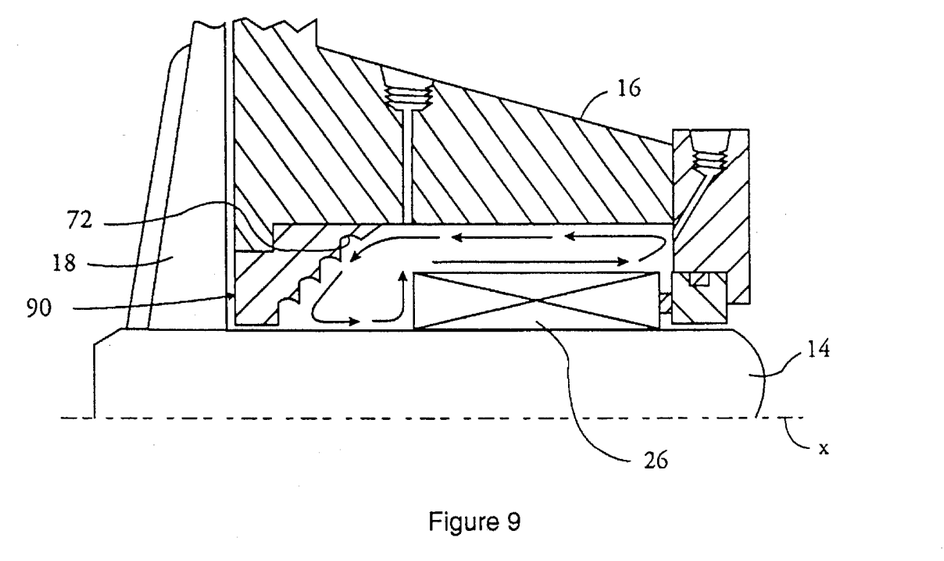
FIG. 9 is an enlarged cross sectional view at the entrance to the seal cavity, schematically showing one of the possible arrangements of the current invention, replacing a removable throat bushing.

The very presence of the spiral groove 64 in the seal cavity induces a flow regime as shown in FIG. 9. A strong radially inward flow is induced along the spiral surface. Particulates of light specific gravity will tend to follow this flow, and the contour of the axial groove surface 66 can be straight as depicted in FIG. 7. If the specific gravity of the particulates is high, for example sand, centrifugal forces will become a major consideration in determining the pattern of behaviour. It has been found that such particulates are conveyed best when the axial surface portion of the groove is contoured in such a manner that centrifugal force holds them in place as they progress along the spiral groove. In general the non-radial surface portion of the groove may be contoured with a depression 72 extending towards the outer diameter, as depicted in FIG. 8. The contour could be, for example, convex (74) with respect to the shaft axis, angled radially outwardly (76) with respect to the shaft axis, peaked (78) with respect to the shaft axis, square (80) or sloping radially inwardly (82) with respect to the shaft axis from behind an edge flange. The selection of the actual contour will depend upon the standard cutting tool available to cut the thread, the most popular and the least difficult to machine being a simple curved surface.

Figure 13:
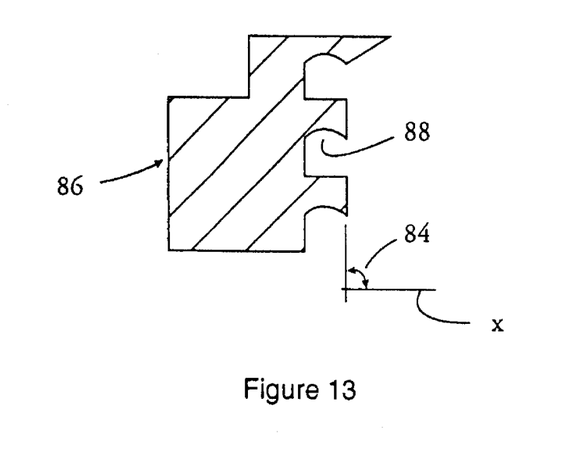
FIG. 13 shows a version of the current invention showing in cross section the general formation of the grooves when the current invention is to be fitted into a seal cavity having a very short axial space available between the seal and the impeller end of the seal cavity.

The inclination angle of the spiral groove will depend upon the axial space available between the back of the mechanical seal and the impeller end of the seal cavity. When a spiral groove is provided then the degree of slope of the face surface 60 need not be limited to the range specified for the basic embodiment of FIGS. 3 and 4. The extreme case is depicted in FIG. 13 where the face angle 84 of the throat bushing 86 is 90 degrees, but the nesting of the grooves 88 in this embodiment limits the size of the particulate which can be handled, and the potential for plugging of the grooves by fibrous materials must be considered. In very large seal cavities, a combination of curvatures may provide the best fit.

The inward, angular progression of the spiral groove itself, will depend upon the specific gravity of the particulate. With very light specific gravity contaminants, a very aggressive angle can be used wherein the spiral groove completes its transition to the inner diameter in less than one revolution. In this case, multiple spiral grooves can be cut using traditional concepts of multiple thread starts. With heavier abrasives such as sand, the spiral groove will have to be more gradual, commonly requiring at least 1.5 or more revolutions.

FIG. 9 shows a throat bushing 90 of the current invention as installed in a seal cavity replacing a removable throat bushing. It is simply press fit into the machined counter-bore intended to accept the regular bushing.

Figure 10:
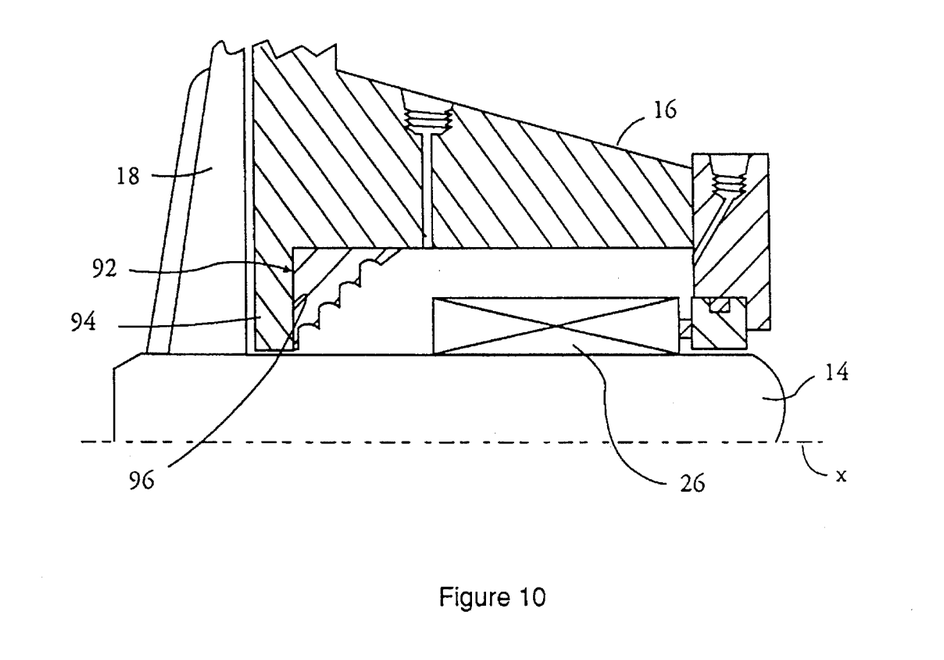
FIG. 10 is an enlarged cross sectional view at the entrance to the seal cavity, schematically showing a throat bushing cast as a permanent part of the seal housing, and showing installation of a version of the current invention, having a flat back surface to conserve axial space.
Figure 11:
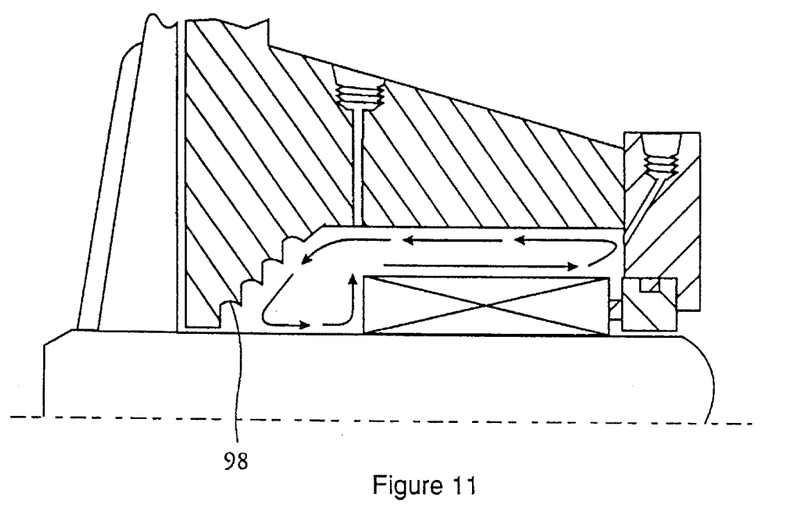
FIG. 11 is a cross section of a version of the present invention which would be cast in place, forming a permanent part of the seal cavity.

FIG. 10 shows a throat bushing 92 of the current invention as pressed into a seal cavity having a fixed throat bushing or flange 94 integral to the seal housing. The throat bushing 92 has a straight back surface 96 to rest flat against the cast-in bushing. FIG. 11 shows that a spiral groove 98 in accordance with the current invention can be cast as an integral part of the seal housing at the throat thereof.

Figure 12:
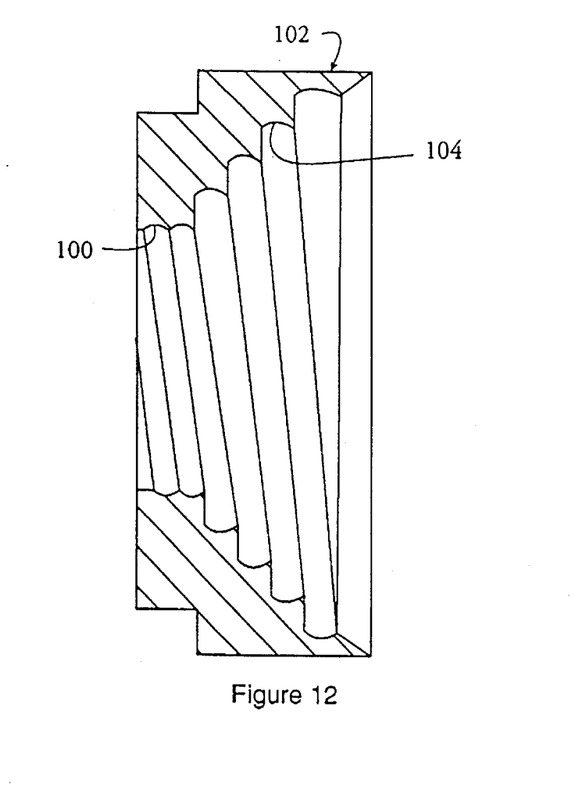
FIG. 12 shows the enhancement of a spiral groove on the inside axial surface of the current invention.

FIG. 12 illustrates another embodiment which can be used to enhance abrasive removal from the seal cavity. In this embodiment a spiral groove 100 extends along the inner cylindrical surface of the throat bushing 102, which groove continues from the inner end point of the radial spiral groove 104 and progresses through to the impeller side. The groove 102 may result in the need for additional flow of a flushing fluid, but will reduce shaft wear by providing an exit path for abrasives. Without such a path or channel, abrasives may be forced into contact with the shaft in such a manner that they are ground into smaller pieces before being forced through the gap by the fluid flow.

Figure 14:
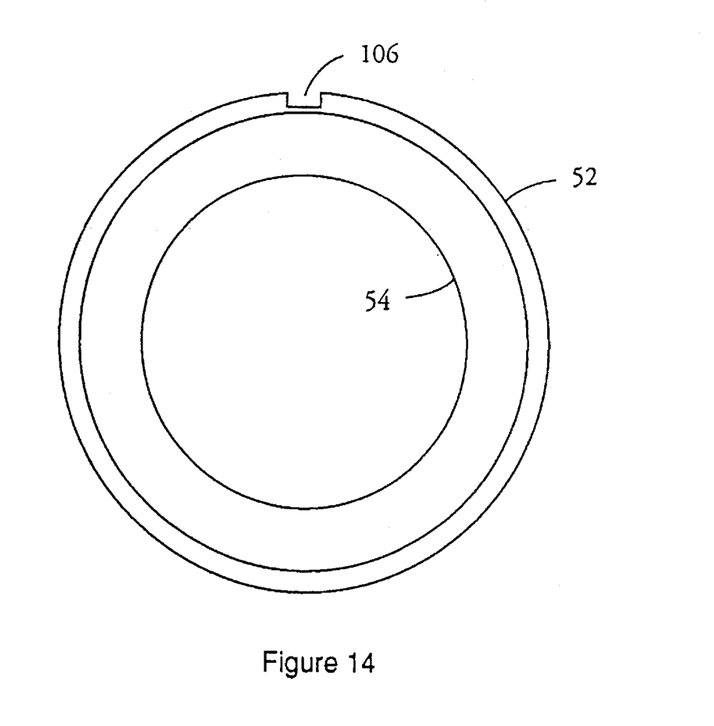
FIG. 14 shows a rear view of the current invention having a rectangular axial groove along the upper surface, extending from the back through to the front surfaces, to vent air from the seal cavity upon flooding of the pump.

FIG. 14 shows a roughly rectangular groove 106 in the outer surface of any of the throat bushings of the present invention, extending from the front surface axially through to the back surface thereof. Many pumps in the petroleum industry incorporate drilled holes through the cast-in throat bushing or flange, at the top, to allow air to escape during flooding of the pump. A throat bushing of the present invention with an axial groove 106 therein can be installed such that the air can pass through both holes and bleed from the seal cavity, while the pump is stationary.

Figure 15:
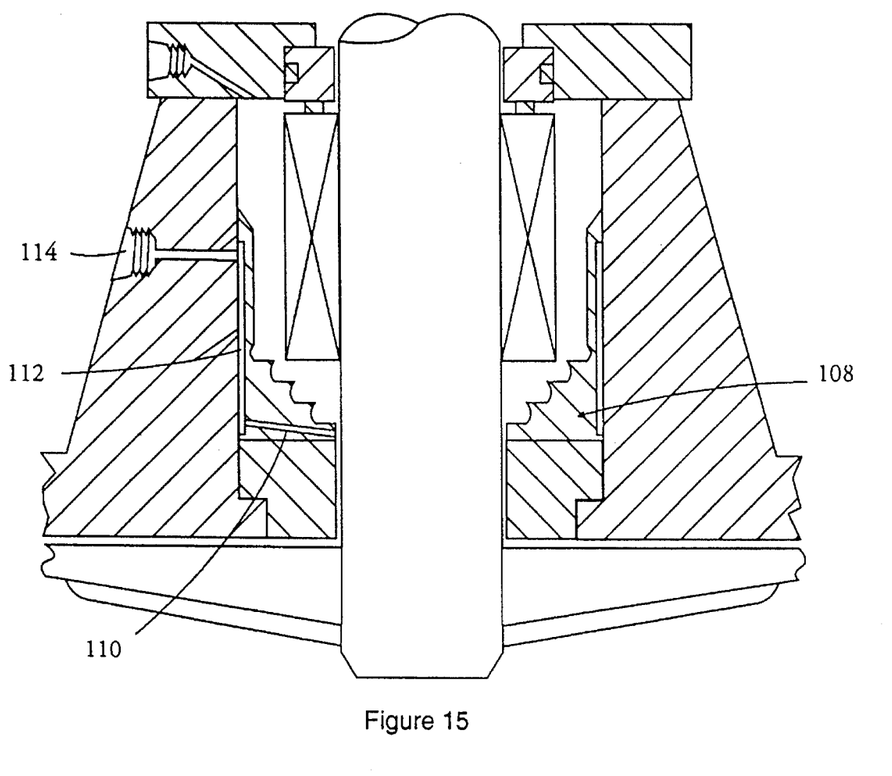
FIG. 15 shows in cross section, the current invention having a drilled hole connecting the inner bore thereof to a recessed channel in the exterior surface, to provide interconnection to the normal seal cavity port for connection to the pump suction. This arrangement would normally be used on vertical pumps, but could be used on all pump types.

FIG. 15 shows in cross section, a throat bushing 108 of the present invention incorporating a hole 110 drilled through the body of the bushing from the outer surface to the inner surface and communicating with a circumferential recess or channel 112 in the outer surface, which interconnects with the standard threaded port 114 in the seal cavity wall. The threaded port 114 is piped to the pump suction to draw air or vapours from the seal cavity. With this version of the current invention, the air is drawn from near the area of the shaft where it centrifuges during pump operation. Since the air is lighter in specific gravity than any liquid, it centrifuges inwardly. This arrangement dramatically improves the removal of air, since it works with the dynamics of the pump. The spiral throat bushing in this or any other version can be formed integral to the steady bushing which is commonly used in the bottom of seal cavities in vertical pumps. It is convenient, but not essential, to provide the recess 112. The important aspect of this feature is communication of the gap between the shaft and the inner surface of the bushing with pump suction for air removal.

Figure 16:
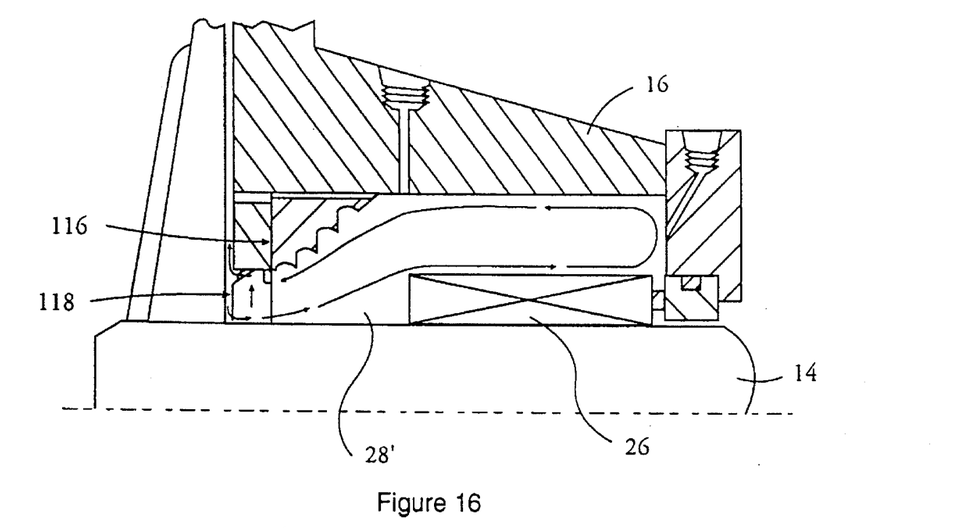
FIG. 16 shows in cross section the current invention used in conjunction with a seal protector for internal recirculation.

FIG. 16 shows the use of a throat bushing 116 in accordance with this invention to transport abrasive material from a very large seal cavity 28' inward to an installed seal protector 118 for removal. Such a seal protector is shown, for example, in my U.S. Pat. Nos. 4,872,690 and 5,167,418. This arrangement allows the seal protector 118 to exchange cleaned fluid into and out of the seal cavity without external connections.

Figure 17:
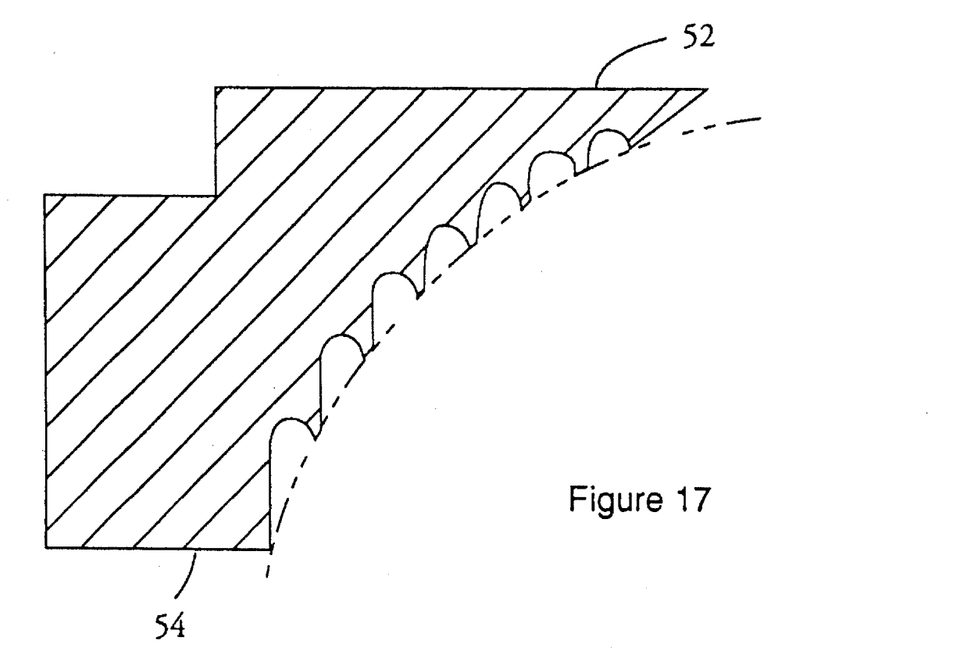
FIG. 17 shows in cross section yet another embodiment of the invention wherein the face surface area of the throat bushing is generally concave.

FIG. 17 shows yet another embodiment of this invention, which could be used with any of the spiral groove configurations already mentioned. In this embodiment the slope of the sloping face of the throat bushing is not constant as in the other embodiments; the slope actually increases progressively from the outer area thereof towards the inner surface, giving the face a generally concave appearance when looking at it from the seal cavity. This configuration is advantageous when axial space is at a premium. The face containing the spiral groove may start out with a slope of about 20 degrees at the outer surface 52 of the bushing and by the time the groove reaches the inner surface 54 the slope could be approaching 90 degrees.

The present invention provides a throat bushing which can be integrally formed in the seal housing, which can be used as a replacement for an existing throat bushing, or which can be used in conjunction with an existing throat flange at the entrance to the seal cavity. The throat bushing of this invention uses an angled surface which faces the interior of the seal cavity and which directs, and possibly accelerates, circulating fluid within the seal cavity towards the exit from the cavity adjacent the rotating shaft. Contaminants carried by the circulating fluid are directed out of the cavity before they can seriously damage the shaft or the seals within the cavity. By providing one or more spiral grooves in the angled surface the efficiency of contaminant removal is greatly enhanced. The grooves would be configured in order to best accommodate the contaminant material expected to be present within the fluid flowing in the seal cavity. The throat bushing of the invention can be manufactured from any material that is chemically compatible with the fluid found in the seal cavity and offers acceptable wear resistance. Furthermore, the throat bushing of this invention can be assembled into rotary fluid equipment with an absolute minimum of modification to that equipment being required. Thus it becomes very inexpensive to upgrade existing equipment so as to obtain the benefits of the invention.

The foregoing is intended to describe the preferred embodiments of the present invention, but it is clear that a skilled person could effect detail changes without departing from the spirit of the invention. Accordingly the protection to be afforded the invention is to be determined from the claims appended hereto.

I claim:

1. A seal cavity throat bushing for use with rotary fluid equipment having a seal cavity which is defined by a rotary shaft having an axis, a shaft housing surrounding at least a portion of the shaft, and seal means engaging the shaft and said housing at one end of the cavity, said bushing comprising an annular element adapted for a tight fit in said housing at an entrance to said cavity opposite said one end, said element having a radially outer cylindrical surface for contacting a cavity wall of said housing, a radially inner cylindrical surface having a diameter greater than that of said shaft to define a gap therebetween, and an annular face surface which, with said bushing in position at said entrance, faces said cavity and slopes inwardly towards said entrance from said bushing outer surface to said bushing inner surface, said sloping face surface serving to direct fluid and contaminants within said cavity towards said gap during operation of said rotary equipment.

2. The throat bushing of claim 1 wherein said face surface slopes inwardly at an angle of between about 20 degrees and 40 degrees with respect to said outer cylindrical surface.

3. The throat bushing of claim 1 wherein a spiral groove open to said face surface is located in said element, the hand of said groove being in the same direction as the rotation of said shaft.

4. The throat bushing of claim 3 wherein the start of said groove is positioned radially inwardly from said outer cylindrical surface, the portion of said sloping face surface between the outer cylindrical surface and said start providing a gentle lead-in for fluid and contaminants to said groove.

5. The throat bushing of claim 4 wherein said groove has radial and non-radial surface portions, the non-radial portion extending into the body of the element from the face surface and the radial portion extending generally radially from the inner end of the non-radial portion back to the face surface.

6. The throat bushing of claim 5 wherein the configuration of said non-radial surface portion is selected from the group consisting of parallel to said axis, angled radially outwardly with respect to said axis, convex with respect to said axis, peaked with respect to said axis, square behind an edge flange of the groove, and angled radially inwardly behind an edge flange of the groove.

7. The throat bushing of claim 6 including another spiral groove in said element, opening to said inner cylindrical surface of said bushing and continuous with the spiral groove opening to said face surface.

8. The throat bushing of claim 1 wherein said element includes a radial face portion opposite said face surface adapted to mate with a throat flange portion of said housing at the entrance to said cavity.

9. The throat bushing of claim 1 for use with a shaft housing having a radial throat flange at the entrance to said cavity, said flange having one or more bores extending therethrough parallel to said shaft axis, said bushing including one or more grooves in the outer cylindrical surface thereof parallel to the shaft axis and communicating said cavity to said bores.

10. The throat bushing of claim 1 including a bore extending through said throat bushing between said outer and said inner cylindrical surfaces and communicating with a standard port in said housing.

11. The throat bushing of claim 10 including a circumferential recess in said outer cylindrical surface for communicating said bore with said port.

12. The throat bushing of claim 4 wherein the slope of said face surface with respect to said outer cylindrical surface is constant.

13. The throat bushing of claim 4 wherein the slope of said face surface increases progressively with respect to said shaft axis from the start of said groove towards said inner surface.

14. A seal cavity throat protector for rotary fluid equipment having a seal cavity which is defined by a rotary shaft having an axis, a shaft housing surrounding at least a portion of the shaft, seal means engaging the shaft and the housing at one end of the cavity, and an annular throat flange at an entrance to the cavity opposite said one end, said throat flange including an inner cylindrical surface spaced from said shaft so as to define a gap therebetween, said protector comprising: a face surface of said throat flange facing said cavity and having an outer portion sloping inwardly from an outer cylindrical wall of said cavity to an inner portion which continues to slope inwardly to said inner cylindrical surface; and a spiral groove formed in said element, opening to said inner sloping surface portion of said face surface, the hand of said groove being in the same direction as the rotation of said shaft; said outer sloping surface portion serving to direct fluid and contaminants within said cavity into said groove and said groove serving to direct such fluid and contaminants towards said gap during operation of said rotary equipment.

15. The throat protector of claim 14 wherein said groove has radial and non-radial surface portions, the non-radial portion extending into the body of the protector from the inner face surface portion thereof and the radial portion extending generally radially from the inner end of the non-radial portion back to the inner face surface portion.

16. The throat bushing of claim 15 wherein the configuration of said non-radial surface portion is selected from the group consisting of parallel to said axis, angled radially outwardly with respect to said axis, convex with respect to said axis, peaked with respect to said axis, square behind an edge flange of the groove, and angled radially inwardly behind an edge flange of the groove.

17. The throat bushing of claim 16 including another spiral groove in said protector, opening to said inner cylindrical surface of said throat flange, and continuous with the spiral groove opening to said inner face surface portion.

18. A seal cavity throat bushing for use with rotary fluid equipment having a seal cavity which is defined by a rotary shaft having an axis, a shaft housing surrounding at least a portion of the shaft, and seal means engaging the shaft and said housing at one end of the cavity, said bushing comprising an annular element adapted for a tight fit in said housing at an entrance to said cavity opposite said one end, said element having: a radially outer cylindrical surface for contacting a cavity wall of said housing; a radially inner cylindrical surface having a diameter greater than that of said shaft to define a gap therebetween; an annular face surface which, with said bushing in position at said entrance, faces said catty and slopes inwardly towards said entrance from said bushing outer surface towards said bushing inner surface; a spiral groove in said element opening to said face surface, the hand of said groove being in the same direction as the rotation of said shaft; and another spiral groove in said element, opening to said inner cylindrical surface and continuous with the spiral groove opening to said face surface; said sloping face surface and said spiral groove opening to said face surface serving to direct fluid and contaminants within said cavity towards said gap during operation of said rotary equipment.

19. The throat bushing of claim 18 wherein said face surface slopes inwardly at an angle of between about 20 degrees and 40 degrees with respect to said outer cylindrical surface.

20. The throat bushing of claim 19 wherein the start of said groove is positioned radially inwardly from said outer cylindrical surface, the portion of said sloping face surface between the outer cylindrical surface and said start providing a gentle lead-in for fluid and contaminants to said groove opening to said face surface.

21. The throat bushing of claim 20 wherein said groove opening to said face surface has radial and non-radial surface portions, the non-radial portion extending into the body of the element from the face surface and the radial portion extending generally radially from the inner end of the non-radial portion back to the face surface.

22. The throat bushing of claim 21 wherein the configuration of said non-radial surface portion is selected from the group consisting of parallel to said axis, angled radially outwardly with respect to said axis, convex with respect to said axis, peaked with respect to said axis, square behind an edge flange of the groove, and angled radially inwardly behind an edge flange of the groove.

23. The throat bushing of claim 19 wherein the slope of said face surface with respect to said outer cylindrical surface is constant.

\* \* \* \* \*